May 7, 1957 H. M. GEYER ET AL 2,791,128
ROTARY ACTUATOR
Filed April 1, 1954 2 Sheets-Sheet 1

INVENTOR.
Howard M. Geyer
BY James N. Tootle

Craig V. Morton
Attorney

May 7, 1957

H. M. GEYER ET AL 2,791,128

ROTARY ACTUATOR

Filed April 1, 1954

INVENTOR.
Howard M. Geyer
BY James N. Tootle

Craig V. Morton
Attorney

United States Patent Office 2,791,128
Patented May 7, 1957

2,791,128

ROTARY ACTUATOR

Howard M. Geyer, Dayton, and James N. Tootle, Troy, Ohio, assignors to General Motors Corporation, Detroit, Mich., a corporation of Delaware Application April 1, 1954, Serial No. 420,326

2 Claims. (Cl. 74—441)

This invention pertains to rotary actuators, and particularly to a rotary actuator with anti-backlash means.

Heretofore, precise angular adjustment of a control device has been difficult, if not impossible, to obtain by means of a rotary actuator. This problem has been attributed to the backlash inherent in rotary actuators presently used to effect angular adjustment of control devices. One of the salient features of this invention resides in the fact that backlash between the relatively rotatable parts of an actuator is substantially eliminated. Accordingly, among our objects are the provision of a rotary actuator including means for eliminating backlash between relatively rotatable parts; the further provision of means for eliminating backlash between relatively rotatable members having helical spline teeth; and the still further provision of means for misaligning the teeth of one helically splined member so as to eliminate backlash between a plurality of relatively rotatable helically splined members.

The aforementioned and other objects are accomplished in the present invention by separating one helically splined member into two sections, inserting shims between the two sections, and thereafter assembling the two sections so that the spline teeth of the member are misaligned a predetermined amount. Specifically, the actuator embodying the helical spline arrangement of this invention comprises a cylinder having disposed therein a reciprocable piston capable of fluid pressure actuation in both directions. The piston has attached thereto an axially extending skirt having a portion with internal and external helical splines. The splined portion of the skirt is originally machined as an integral unit and thereafter divided into two annular sections. A plurality of shims are interposed between the two axially spaced splined sections, after which the two sections are assembled to form a spline member having misaligned teeth.

The external misaligned splines of the piston skirt engage internal helical splines formed on a portion of the internal piston periphery, and the internal misaligned splines of the annular skirt engage helical splines formed on a member rotatably journaled in the cylinder. The actuator piston divides the cylinder into two chambers, which are connected with a pair of ports so that pressure fluid may be admitted to either chamber so as to effect reciprocable piston movement. The cylinder is normally restrained against rotation such that upon reciprocable movement of the piston, the piston has imparted thereto a slight angular movement due to the helical spline connection between the skirt and the cylinder walls. During reciprocable movement of the piston, rotation is imparted to the output member of the actuator which is equal to the sum of the rotary movement produced by the helically splined surfaces of the cylinder, the piston skirt and the output member.

Further objects and advantages of the present invention will be apparent from the following description, reference being had to the accompanying drawings wherein a preferred embodiment of the present invention is clearly shown.

Figure 1:
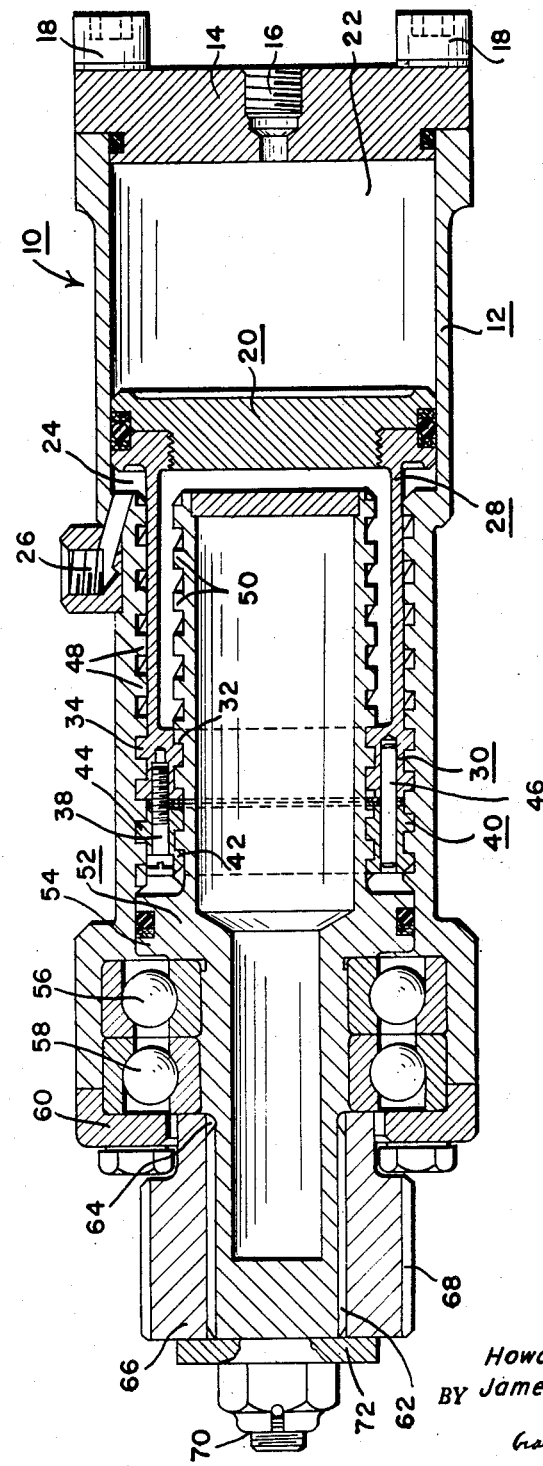
Fig. 1 is a longitudinal sectional view of an actuator constructed according to the present invention.

With particular reference to Fig. 1, an actuator 10 is shown including a cylinder 12, one end of which is closed by a cap member 14 having formed therein an extend port 16 and carrying a pair of spaced brackets 18 by which means the actuator cylinder may be attached to any suitably fixed support, not shown. The actuator cylinder 12 is adapted to be restrained against all movement, both linear and rotary by the interconnection of bracket members 18 with a fixed support. The cylinder 12 has disposed therein a reciprocable piston 20 which divides a cylinder into an extend chamber 22 and a retract chamber 24, the cylinder also having a retract port 26 formed therein.

Figures 2, 3:
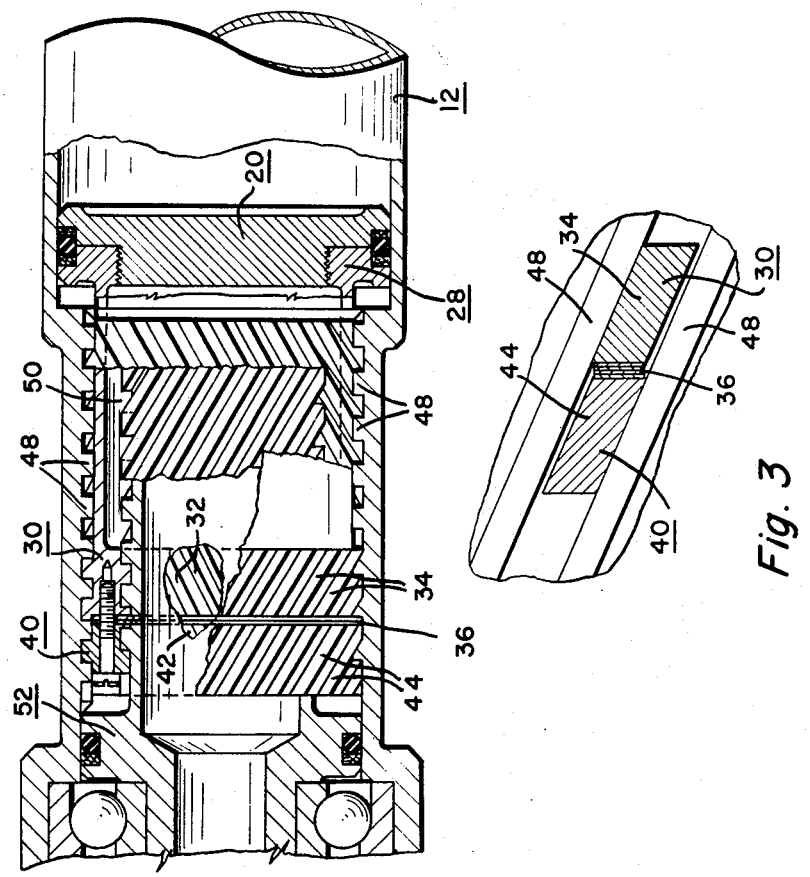
Fig. 2 is a fragmentary view, partly in section and partly in elevation, illustrating the helical spline arrangement.
Fig. 3 is an enlarged fragmentary view, partly in section and partly in elevation, depicting the manner in which backlash between the helically splined members is eliminated.

The piston 20 sealingly engages the internal walls of the cylinder 12 and has threadedly connected thereto and movable therewith an annular skirt 28. The annular skirt 28 includes two sections 30 and 40. As is seen more particularly in Fig. 2, the section 30 is formed with internal helical spline teeth 32 and external helical spline teeth 34, while the section 40 is formed with internal helical spline teeth 42 and external helical spline teeth 44. Originally, the skirt 28 is made as an integral unit having helically splined sections 30 and 40. Thereafter, the splined portion of the annular skirt splits into two sections and a plurality of spacing means, or shims, 36 are inserted therebetween after which, the two sections 30 and 40 are reassembled by means of a plurality of circumferentially spaced bolts 38 and dowel pins 46. In so doing, the external helical spline teeth 34 and 44, as well as the internal helical spline teeth 32 and 42 are misaligned a predetermined amount, as depicted in Figs. 1 and 2.

The external helical spline teeth on sections 30 and 40 engage internal helical spline teeth 48 formed on the inner periphery of the cylinder 12. The internal helical spline teeth of sections 30 and 40 engage helical spline teeth 50 formed on the external surface of an actuator output member 52.

As shown particularly in Fig. 1, the actuator output member 52 is formed with a shoulder portion 54, which sealingly engages the cylinder walls, the member 52 being rotatably supported within the cylinder 12 by ball bearing means 56 and 58. The outer races of ball bearing means 56 and 58 are retained in position by an annular flange member 60, which is bolted to the cylinder, as shown in Fig. 1.

The actuator output member 52 is also formed with a series of straight splines 62, which are engaged by internal straight splines 64 of an annular member 66 having an externally straight splined surface 68. The actuator output member 62 may be connected to any suitable load device through the member 66. Moreover, lineal movement of the actuator output member 62 relative to the cylinder 12 is precluded by reason of the member 52 being assembled with the member 66 through a nut and bolt arrangement 70 and a washer 72. Thus, the members 52 and 66 are drawn tightly against the inner races of the ball bearings 56 and 58 so as to prevent axial movement of the member 52 relative to the cylinder 12.

With particular reference to Fig. 3, the manner in which the misaligned spline teeth of the sections 30 and 40 eliminate backlash between the several relatively rotatable members will be described in greater detail. From an inspection of Fig. 3, it may be seen that the helical spline teeth 34 and 44, by reason of being held in axially spaced relationship by the shim means 36, are misaligned a predetermined amount. The axial spacing of the sections 30 and 40 is chosen so that the helical spline teeth 34 and 44, as shown in Fig. 3, are snugly received within the grooves between helical spline teeth 48 on the internal cylinder periphery. The same is, likewise, true of the helical spline connection between teeth 32 and 42 of the annular skirt 28 and the helical spline teeth 50 of the rotary output member 52. In this manner, the backlash heretofore inherent in a helical spline connection has been substantially eliminated. Accordingly, the position of output member 52 and any control device associated therewith may be precisely controlled by movement of the piston 20.

Operation of the actuator disclosed herein is substantially as follows, reference being had to Fig. 1. Upon the application of pressure fluid to the retract chamber 24 through the retract port 26, while the extend chamber 22 is connected to drain through extend port 16, the piston 20 will move to the right, as viewed in Fig. 1. Linear movement of the piston 20 is accomplished by slight annular movement thereof due to the inner action of the helical splines on the skirt 28 with the cylinder wall. Moreover, this slight annular movement of the piston 30 and the cylinder 28 will be imparted to the output member 52 such that the output member will be rotated with a movement that is the sum of the rotation caused by spline teeth 48 and 34, 44, and 32, 42 and 50. Moreover, by reason of the misaligned helical spline teeth on the annular skirt sections 30 and 40, the output member 52 will be accurately positioned without any backlash between the relatively rotatable parts. Conversely, when pressure fluid is applied to extend chamber 22 and retract chamber 24 is connected to drain, the output member 52 will be rotated in the opposite direction.

While the embodiment of the present invention as herein disclosed, constitutes a preferred form, it is to be understood that other forms might be adopted.

What is claimed is as follows:

1. A rotary actuator including in combination, a cylinder, a reciprocable piston disposed in the cylinder, said cylinder having internal helical spline teeth, an annular skirt rigidly connected to said piston and having internal and external helical spline teeth, a member rotatably journaled in said cylinder having external helical spline teeth, the external helical spline teeth on said skirt mating with the internal helical spline teeth on said cylinder, the internal helical spline teeth on said skirt mating with the external spline teeth on said member whereby rotation will be imparted to said member upon reciprocation of said piston, an annular element having internal and external helical spline teeth, a plurality of shims disposed between said annular element and an end of said annular skirt, and means for rigidly connecting said annular element to said skirt to stagger the relationship between the helical spline teeth on the annular skirt and the annular element and thereby eliminate backlash in the helical spline connections between the cylinder, the skirt, the annular element and the rotatable member.

2. A rotary actuator including in combination, a cylinder, a reciprocable piston disposed in the cylinder, said cylinder having internal helical spline teeth, an annular skirt rigidly connected to said piston and having internal and external helical spline teeth, a member rotatably journaled in said cylinder having external helical spline teeth, the external helical spline teeth on said skirt mating with the internal helical spline teeth on said cylinder, the internal helical spline teeth on said skirt mating with the external spline teeth on said member whereby rotation will be imparted to said member upon reciprocation of said piston, an annular element having internal and external helical spline teeth, shim means disposed between said annular element and an end of said annular skirt, and means for rigidly connecting said annular element to said skirt to stagger the relationship between the helical spline teeth on the annular skirt and the annular element and thereby eliminate backlash in the helical spline connections between the cylinder, the skirt, the annular element and the rotatable member.

References Cited in the file of this patent

UNITED STATES PATENTS

| | | |
|---|---|---|
| 1,145,800 | Rushton | July 6, 1915 |
| 1,946,309 | Coffman | Feb. 6, 1934 |
| 2,027,562 | Smith | Jan. 14, 1936 |
| 2,429,863 | Wright | Oct. 28, 1947 |